United States Patent [19]
Hamm

[11] Patent Number: 6,030,107
[45] Date of Patent: Feb. 29, 2000

[54] HEADLIGHT UNIT FOR MOTOR VEHICLE HAVING COLLECTING MEANS FOR LIGHT BEAM NOT BUNDLED BY A LENS OR INTERCEPTED BY A HEADLIGHT DIAPHRAGM

[75] Inventor: Michael Hamm, Pfullingan, Germany

[73] Assignee: Robert Bosch GmbH, Stuttgart, Germany

[21] Appl. No.: 09/149,583

[22] Filed: Sep. 8, 1998

[30] Foreign Application Priority Data

Sep. 13, 1997 [DE] Germany .............................. 197 40 315

[51] Int. Cl.⁷ ...................................................... B60Q 1/04
[52] U.S. Cl. .......................... 362/511; 362/538; 362/539; 362/520; 362/507; 362/551
[58] Field of Search ...................... 362/554, 556, 362/487, 496, 505–507, 509, 511, 516–518, 520–522, 538, 539, 307, 308

[56] References Cited

U.S. PATENT DOCUMENTS 5,132,881  7/1992  Wakimizu et al. ...................... 362/539
5,199,779  4/1993  Sato ......................................... 362/539

FOREIGN PATENT DOCUMENTS 32 18 703 A1  11/1983  Germany .

Primary Examiner—Sandra O'Shea
Assistant Examiner—Ishmael Negron
Attorney, Agent, or Firm—Michael J. Striker

[57] ABSTRACT

A headlight unit for a motor vehicle has a light source, a reflector for bundling a radiation of the light source, a first lens device on which the radiation of the light source is bundled by the reflector, the first lens device deviating a light beam bundle in an illumination direction from the headlight unit, a light conductor system having light outlet surfaces, and means for coupling arranged in a region between the reflector and the first lens device and coupling those light beams which are not bundled on the first lens device, in the light guiding system with the light outlet surfaces.

10 Claims, 1 Drawing Sheet

HEADLIGHT UNIT FOR MOTOR VEHICLE HAVING COLLECTING MEANS FOR LIGHT BEAM NOT BUNDLED BY A LENS OR INTERCEPTED BY A HEADLIGHT DIAPHRAGM

BACKGROUND OF THE INVENTION

The present invention relates to headlight units for motor vehicles.

More particularly, it relates to a headlight unit for a motor vehicle which has a light source and a reflector for concentrating the radiation of the light source on a first lens device which deviates the light beam bundle in an illumination direction from the headlight.

Halogen lamps or gas discharge lamps can be used as light sources. The reflector can be formed as an elliptic mirror or the like. Such a headlight, depending on the construction, can bundle not the total radiation of the light source from the reflector to the lens device and directly use for the illumination purposes. In order to use such a part of the radiation of the light source for illumination purposes which is not bundled by the reflector on the lens device, known headlight units are provided with additional reflector elements for deviating this part of the radiation through the associated dispersion optical element in the illumination direction from the headlight unit and directly for the illumination purposes. With this additional indirectly used radiation, the signal image of the headlight unit can be increased.

While with this approach almost the total radiation of the light source can be used for illumination purposes, it has some disadvantages. The insertion of the additional reflector elements elongates a direct geometrical and spacial extents of the reflector elements to the part of the light beams which is not bundled on the lens device. In other words, in order to produce a predetermined signal image of the headlight unit, the shape and the position of the additional reflector elements must be exactly preselected. There are no free spaces both with respect to the desired signal image and with respect to the shape of the headlight unit.

A headlight unit of the above mentioned general type is disclosed for example in the German patent document DE 32 18 703. The headlight unit disclosed in this reference has a wing-shaped prism discs around the first lens device, in order to make possible the use of the part of the radiation of the light source for the illumination purposes which is not bundled by the reflector to the lens device. The known headlight unit also has the disadvantages that a direct geometrical and spacial relationship of the prims discs to the part of the light beams not bundled on the light device must be provided. In other words, in order to produce a predetermined signal image of the headlight unit, the shape and the position of the wing-shaped prism discs are exactly preselected. Here also a design freedom fails both with respect to the desired signal image and with respect to the shape of the headlight unit.

SUMMARY OF THE INVENTION

Accordingly, it is an object of the present invention to provide a headlight unit for a motor vehicle of the above mentioned type, which avoids the disadvantages of the prior art.

More particularly, it is an object of present invention to provide a headlight unit for a motor vehicle, which is formed so that a part of the radiation of the light source can be used indirectly for illumination purposes and the like, which is not directly used for illumination purposes, and a maximum possible design freedom is provided with respect to the desired signal image of the headlight unit and also with respect to the outer shape of the headlight unit.

In keeping with these objects and with others which will become apparent hereinafter, one feature of present invention resides, briefly stated in a headlight unit for a motor vehicle, in which, around the region between the reflector and the first lens device, means is arranged for coupling, and the means is formed so that it couples the light beams which are not bundled to the first lens device, in the light conductor system with light outlet surfaces.

The first lens device is formed preferably as a projection lens. The reflector for bundling the radiation is preferably formed as an ellipsoidal reflector. The means for coupling is composed of fiber optics or light conductor rods. In the light conductor system, fiber optics, light conductor rods of synthetic plastic or glass, or mirrored or total-reflecting hollow conductors can be used.

When the headlight unit is designed in accordance with the present invention, it is possible to use indirectly the part of the radiation of the light source which is not bundled to the lens device. This part of the radiation is coupled in the light conductor system and can be reflected from it without problems at any arbitrary position and in almost any directions. The radiation reflected from the light conductor system is preferably used for expanding the signal image of the headlight unit so the greater regions are illuminated by the motor vehicle.

Moreover, the signal image of the headlight unit can have any arbitrary form. Within the illuminated regions, any heavy points with respect to the light density can be set. For example, a smaller light density can be produced in the region of the left roadway edge to prevent blinding of a traffic participant coming from the opposite direction. Moreover, the increase of the signal image leads to a reduced average light density, and therefore the traffic participant coming from the opposite direction is less blinded despite a generally high intensity of the inventive headlight unit. Thereby with the inventive headlight unit, it is possible to provide a maximum design freedom with respect to the desired signal image of the headlight unit and also with respect to the outer shape of the headlight unit.

The light beams coupled in the light conductor system can be also used for additional illumination purposes of the headlight unit to perform other functions. For example it is recommended to use the coupled light beams for driving a control light, with which the operation of the headlight unit can be monitored.

In the ellipsoidal headlight units, a diaphragm screen is arranged between the reflector and the first lens device substantially transversely to the illumination direction. Its contour is formed as a bright-dark limit on the street. In accordance with a preferable embodiment of the invention, at the front side of the diaphragm screen which is directed opposite to the light source, means for coupling those light beams in a light conductor system with light outlet surfaces is arranged, which strike on the front side of the diaphragm screen. Thereby those light beams of the light source are drawn indirectly for illumination purposes, which strike on the front side of the diaphragm screen.

Basically all light beams of the light source which are not directly used for illumination purposes, are used through the light conductor indirectly for the illumination purposes, etc. The presumption is that these light beams are coupled in the light conductor system, through which they are guided to the desired point of use where they are reflected from the light conductor system.

In accordance with a preferable embodiment of the invention, the light outlet surfaces of the light conductor system are arranged around the first lens device.

The light outlet surfaces can be arranged at approximately any points around the first lens device of the headlight unit, so that a great design freedom can be obtained with respect to the outer shape of the headlight unit. This great design freedom is also provided by the fact that with the use of the light conductor system, the coupled light beams without problems can be guided from the coupling optics through wide paths up to the light outlet surfaces at the point of use. The light outlet surfaces must not have any direct geometrical or spacial relationship to the part of the light beams which is directly used for the illumination purposes.

Moreover, further design freedom with respect to the outer shape of the headlight unit is provided by the feature that the light outlet surfaces of the light conductor system can have any arbitrary shapes.

In accordance with a preferable embodiment of the present invention, the design freedom with respect to the desired signal image of the headlight unit is provided in particular by the feature that the light outlet surfaces can be oriented so that the signal image of the headlight unit has a desired design.

In order to bundle the beam bundle from the light outlet surfaces of the light conductor system parallel and to produce additional changes in the illumination direction of the desired light density, in accordance with a further embodiment of the invention, the second lens devices are arranged before the light outlet surfaces of the light conductor system as considered in an illumination direction.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a headlight unit for a motor vehicle in accordance with the present invention.

DESCRIPTION OF PREFERRED EMBODIMENTS

Figure 1:
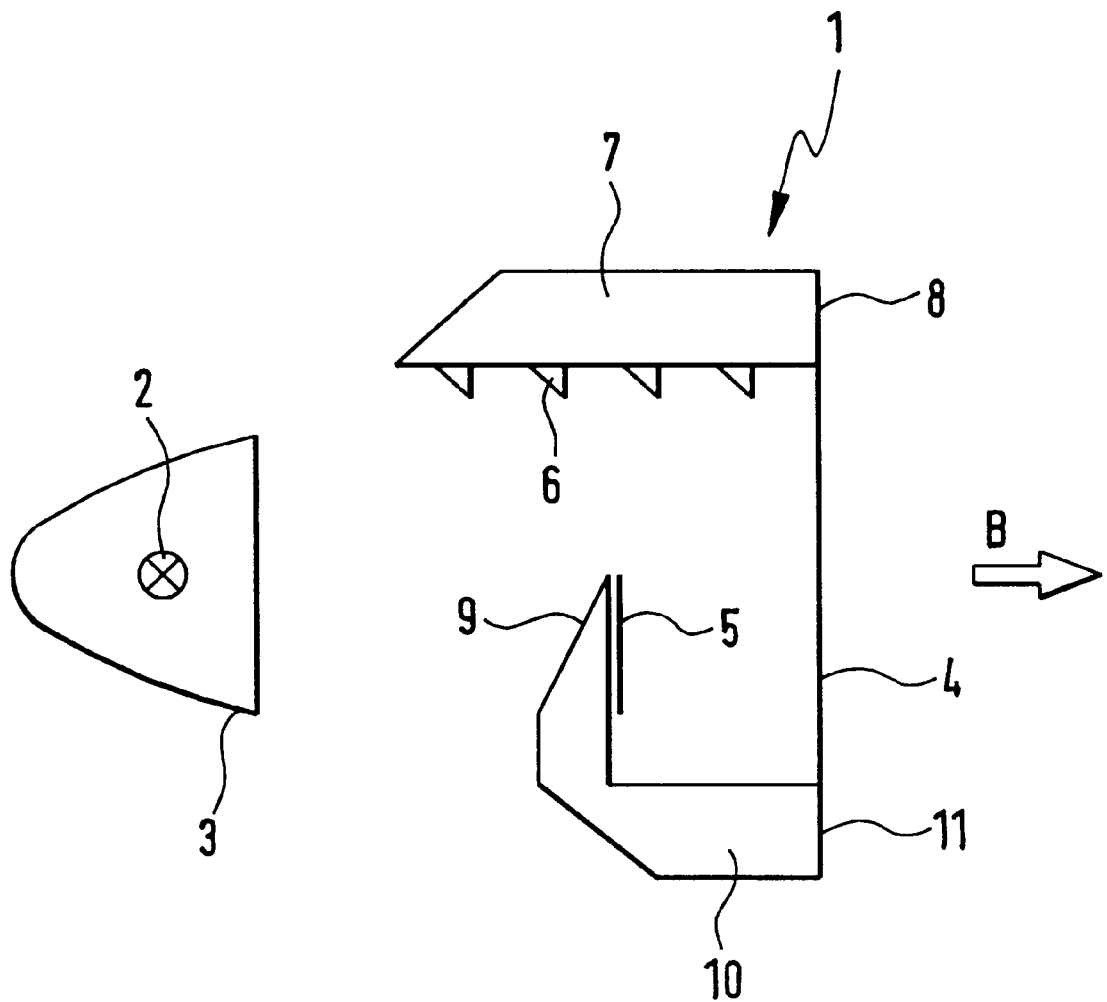

A headlight unit in accordance with the present invention is used for a motor vehicle and is identified with reference numeral 1 in FIG. 1. The headlight unit 1 has a light source 2 and a reflector 3 for bundling of the radiation of the light source 2. The reflector 3 is formed preferably as an ellipsoidal reflector for bundling of the radiation. The light beam bundle is deviated in the illumination direction B to a first lens device 4. From the first lens device 4 the light beam bundle exits the headlight unit 1 for illumination purposes. The first lens device 4 is preferably formed as a projection lens. A diaphragm screen 5 is arranged between the ellipsoid reflector 3 and the projection lens 4. Its contour is formed as a bright-dark limit on the street.

In such headlight units 1, because of the construction, not the total radiation of the light source 2 can be bundled by the ellipsoidal reflector 3 to the projection lens 4. A part of the radiation is unused and deviates laterally between the ellipsoidal reflector 3 and the projection lens 4, or falls on the front side of the diaphragm screen 5 and is not available for the illumination purposes.

In accordance with the present invention, means 6 for coupling are arranged in the region between the ellipsoidal reflector 3 and the projection lens 4. The means 6 couples the light beams which are not bundled by the projection lens 4 in a light conductor system 7 with light outlet surfaces 8. Moreover, at the front side of the diaphragm screen 5 which is oriented against the light source 2, a means 9 is provided for coupling in a light conductor system 10 with the light outlet surfaces 11 those light beams which do not strike against the front side of the diaphragm screen 5. Thereby also the part of the radiation of the light source 2 which is not directly used for illumination purposes can be also used for the illumination purposes indirectly.

The light conductor systems 7 and 10 are formed as light conductor rods of a synthetic plastic material. The light beams coupled in the light conductor system 7 and 10 are guided in them to the light outlet surfaces 8 and 11. The light outlet surfaces 8 and 11 are arranged around the projection lens 4. The light outlet surfaces are oriented so that the light beams reflected from the light conductor systems 7 and 10 in the illumination direction B increase the signal image of the headlight unit 1.

The shape of the cross-sectional surface of the light outlet surfaces 8 and 11 can be selected approximately arbitrarily. With the inventive headlight 1, a maximum design freedom is provided both with respect to the shape of the signal image of the headlight unit 1, and also with respect to the outer shape of the headlight unit 1.

It will be understood that each of the elements described above, or two or more together, may also find a useful application in other types of constructions differing from the types described above.

While the invention has been illustrated and described as embodied in headlight for motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight unit for a motor vehicle, comprising a light source; a reflector for bundling a radiation of said light source; a first lens device on which the radiation of the light source is bundled by the reflector, said first lens device deviating a light beam bundle in an illumination direction from the headlight unit; a light conductor system having light outlet surfaces; and means for coupling those light beams which are not bundled on said first lens device, in said light guiding system with said light outlet surfaces; the means for coupling light beams being arranged in a region between said reflector and said first lens device.

2. A headlight unit as defined in claim 1, wherein said first lens device is formed as a projection lens.

3. A headlight unit as defined in claim 1, wherein said reflector for bundling radiation is formed as an ellipsoidal reflector.

4. A headlight unit as defined in claim 1, wherein said light outlet surfaces of said light conductor system are arranged around said first lens device.

5. A headlight unit as defined in claim 1, wherein said light outlet surfaces of said light conductor system are oriented so that a signal image of the headlight unit has a desired design.

6. A headlight unit as defined in claim 1; and further comprising a second light device arranged in the illumination direction before said light outlet surfaces of said light conductor system and deviating the light beam bundle in the illumination direction from said light conductor system.

7. A headlight unit as defined in claim 1; and further comprising a second light device arranged in the illumination direction before said further light outlet surfaces of said further light conductor system and deviating the light beam bundle in the illumination direction from said further light conductor system.

8. A headlight unit as defined in claim 1; and further comprising a diaphragm screen arranged between said reflector and said first lens device substantially transverse to the illumination direction; a further light conductor system provided with further light outlet surfaces; and further means to couple those light beams which strike on the front side of said diaphragm screen, in said further light system with said further light outlet surfaces; the further means for coupling light beams being arranged at a front side of said diaphragm screen opposite to said light source.

9. A headlight unit as defined in claim 4, wherein said further light outlet surfaces of said further light conductor system are arranged around said first lens device.

10. A headlight unit as defined in claim 8, wherein said further light outlet surface of said further light outlet system are oriented so that a signal image of the headlight unit has a desired design.

* * * * *